(12) United States Patent
Walker et al.

(10) Patent No.: US 6,196,458 B1
(45) Date of Patent: Mar. 6, 2001

(54) METHOD AND APPARATUS FOR PRINTING A BILLING STATEMENT TO PROVIDE SUPPLEMENTARY PRODUCT SALES

(75) Inventors: Jay S. Walker, Ridgefield; Daniel E. Tedesco, Stamford; Andrew S. Van Luchene, Norwalk; Dean Alderucci, Ridgefield, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 08/982,149

(22) Filed: Dec. 1, 1997

(51) Int. Cl.$^7$ ....................................................... G06K 5/00
(52) U.S. Cl. ............................................ 235/380; 705/34
(58) Field of Search .................................... 235/379, 380, 235/375; 340/825.31; 705/34, 36

(56) References Cited

U.S. PATENT DOCUMENTS

| | | |
|---|---|---|
| 4,703,423 | 10/1987 | Bado et al. . |
| 4,948,174 * | 8/1990 | Thomson et al. ........................ 283/58 |
| 5,121,945 * | 6/1992 | Thomson et al. ........................ 283/58 |
| 5,191,525 * | 3/1993 | LeBrun et al. ......................... 364/419 |
| 5,326,959 * | 7/1994 | Perazza ................................. 235/379 |
| 5,344,144 | 9/1994 | Canon . |
| 5,353,219 | 10/1994 | Mueller et al. . |
| 5,458,284 * | 10/1995 | Haan et al. ............................ 229/304 |
| 5,513,102 * | 4/1996 | Auriemma ............................. 364/408 |
| 5,652,421 | 7/1997 | Veeneman . |
| 5,761,650 * | 6/1998 | Munsil et al. ........................... 705/34 |
| 6,006,207 * | 12/1999 | Mumick et al. ......................... 705/38 |

FOREIGN PATENT DOCUMENTS

| | | |
|---|---|---|
| 607686 | 7/1994 | (EP) . |
| 7073375 | 3/1995 | (JP) . |
| WO 97/24680 | 7/1997 | (WO) . |
| WO 97/46961 | 12/1997 | (WO) . |

OTHER PUBLICATIONS

Kate Fitzgerald, "AMEX Program Moves Loyalty to Next Level: Custom Extras Finds a Medium Customers Can't Ignore: Billing Statements", Advertising Age, Nov. 4, 1996, at p. 2.

"MasterCard Purchasing Card: Reduce Costs While Maintaining Control Over Your Company's Purchasing Process", MasterCard International, (http://www.mastercard.com/business/), download date: Feb. 26, 1997.

(List continued on next page.)

Primary Examiner—Thien M. Le
(74) Attorney, Agent, or Firm—Dean Alderucci; Kurt M. Maschoff; Nathaniel Levin

(57) ABSTRACT

A central controller such as one operating for a credit card account issuer receives one or more billing items which are to be printed on an account holder's billing statement. The central controller determines if the billing items, which typically specify purchases, satisfy any merchant-specified upsell offer conditions. Some upsell offer conditions include the purchase of a predetermined product, or a purchase which exceeds a predefined price. Such upsell offer conditions, when satisfied, direct the central controller to offer an upsell on the billing statement. If any of the upsell offer conditions are satisfied, the central controller determines one or more upsells that correspond to the upsell offer condition. The upsells may be, for example, products complementary to previously-purchased products. The upsells are offered to the account holder by printing onto the billing statement indicia that specifies the upsells. Upon receiving an indication that an upsell was accepted, the upsell is provided to the account holder. The account holder may accept the upsell by appropriately modifying the billing statement and returning the statement with payment. The upsell is then provided, typically in the form of a reduced price at a point-of-sale terminal or a discount on a subsequent billing statement.

43 Claims, 7 Drawing Sheets

OTHER PUBLICATIONS

Lisa Fickenscher, "Merchant: American Express Seeks to Mine Its Data on Cardholder Spending Patterns", The American Banker, Mar. 24, 1997 at p. 20.

"Industry Briefs", Card News, Jun. 9, 1997, vol. 12, No.11.

"Marketing Q&A #3", Frankie Hollywood's Public Relations Newsletter, (http://www.americabrightest.com/employer/frankie/news970401.html), download date Sep. 26, 1997.

* cited by examiner

| MERCHANT IDENTIFIER 42 | UPSELL CONDITION 44 | UPSELL 46 | UPSELL PRICE 48 |
|---|---|---|---|
| 1234 | PURCHASE OF ITEM NUMBER 11223344 | MOVIE SOUNDTRACK | $6.99 |
| 5678 | PURCHASE PRICE >$50.00 AT MERCHANT 5678 | HALF OFF NEXT MEAL | $10.00 |
| 9012 | PURCHASE PRICE BETWEEN $60.00 AND $90.00 AT MERCHANT 9012 | $10.00 DISCOUNT | $5.00 |
| 3456 | AT LEAST 3 PURCHASES >$40.00 AT MERCHANT 3456 | $15.00 DISCOUNT OFF PRODUCT 87654321 | $5.00 |
| 7890 | NO PURCHASES MADE AT MERCHANT 7890 | $50.00 DISCOUNT | $20.00 |

FIG. 3

ACCOUNT IDENTIFIER 1111-1111-2222-2222  60 / 62

| TRANSACTION ID 76 | TRANSACTION TYPE 78 | DATE OF TRANSACTION 80 | POST DATE 82 | TRANSACTION AMOUNT 84 | MERCHANT IDENTIFIER 86 | ITEM IDENTIFIER 88 | DESCRIPTION 90 |
|---|---|---|---|---|---|---|---|
| 1234560 | PAYMENT RECEIVED | 11/1/99 | 11/1/99 | $431.17 | - | - | PAYMENT OF OCTOBER BILL |
| 1234561 | PURCHASE | 11/17/99 | 11/19/99 | $60.00 | 5678 | - | DINNER BILL |
| 1234562 | PURCHASE | 11/17/99 | 11/18/99 | $183.25 | 7890 | 82550098 | MEN'S SUIT |
| 1234563 | PURCHASE | 11/18/99 | 11/21/99 | $17.48 | 1234 | 11223344 | VIDEO TAPE |
| 1234564 | PURCHASE | 11/22/99 | 11/24/99 | $219.00 | 5678 | 88765432 | TELEVISION |
| 1234565 | PURCHASE | 11/23/99 | 11/24/99 | $13.31 | 1234 | 11339988 | VIDEO TAPE |

FIG. 5

METHOD AND APPARATUS FOR PRINTING A BILLING STATEMENT TO PROVIDE SUPPLEMENTARY PRODUCT SALES

FIELD OF THE INVENTION

The present invention relates to methods and apparatus for generating billing statements, and more specifically to methods and apparatus for using billing statements to provide supplementary product sales.

BACKGROUND OF THE INVENTION

Many businesses provide each of their customers with a billing statement detailing the customer's charges over a period of time. For example, credit card issuers provide each of their account holders with a billing statement that lists each transaction, such as purchases and payments, which have been applied against their credit card account. Each transaction listed on the statement (each "billing item") specifies a transaction amount, such as a purchase price debited to the account or a payment credited to the account. Billing items may further comprise merchant-specified text identifying the transaction, such as a merchant name, merchant address and/or merchant telephone number. A billing statement further includes an amount of payment due which is calculated by aggregating the transaction amounts.

Billing statements may also be used for advertising to account holders. Many merchants pay one or more credit card issuers for the ability to promote goods and services in flyers that are sent with credit card billing statements. For example, NewSub Services, Inc. is a merchant that advertises magazine subscriptions through attachments to billing statements. In this manner, an account holder's billing statement can serve as a medium for advertising to that account holder.

Billing statements may also be used for notifying account holders of rewards they have earned. First Data Corporation's U-$ave program provides a reward, such as a 10% discount, to each account holder who has met predetermined criteria. The account holder's billing statement indicates the discount earned, and an amount of payment due is adjusted and printed on the statement. Similarly, the American Express Custom Extras program and Express Rewards program each allow merchants to specify reward criteria. Account holders that meet the criteria are notified on their billing statement of what reward they have earned.

Billing statements thus serve to notify account holders of transaction history, merchant promotions and rewards earned. At best, merchants hope that such notification may generate some future sales. However, like all advertising, the notification may be ignored by the account holders, and no future sales to the account holders are guaranteed.

It would be advantageous to provide a method and apparatus for utilizing billing statements in a more efficient manner to generate additional sales to account holders.

SUMMARY OF THE INVENTION

It is an object of the present invention to provide methods and systems using automated, predetermined criteria to print upsell offers for products on a billing statement and allowing account holders to purchase those offered products using the billing statement.

According to one aspect of the present invention, a central controller, such as one operating for a credit card account issuer, receives one or more billing items which are to be printed on an account holder's billing statement. The central controller determines if the billing items, which typically specify purchases, satisfy any merchant-specified upsell offer conditions. The upsell offer conditions may include the purchase of a predetermined product or a purchase which exceeds a predefined price.

Such upsell offer conditions, when satisfied, direct the central controller to offer an upsell on the billing statement. If any of the upsell offer conditions are satisfied, the central controller determines one or more upsell offers that correspond to the upsell offer condition. The upsell offers may be, for example, discounts on predetermined products, especially products complementary to previously purchase products. The upsells are offered to the account holder by printing indicia specifying the upsells onto the billing statement.

The account holder may accept the upsell offer, for example, by circling or marking a corresponding "check box" on the billing statement and returning the statement with payment. Upon receiving an indication that an upsell offer was accepted, the upsell is provided, typically in the form of a reduced price at a point-of-sale terminal or a discount on a subsequent billing statement.

BRIEF DESCRIPTION OF THE DRAWINGS

FIG. 3 is a schematic illustration of an upsell database of the central controller of FIG. 2.

FIG. 5 is a schematic illustration of a record of an account holder transaction database of the central controller of FIG. 2.

DETAILED DESCRIPTION OF THE PREFERRED EMBODIMENTS

Unlike systems which use a billing statement merely to notify an account holder of what he has already been awarded, the methods and apparatus of the present invention provide an automated system using predetermined criteria to print on a billing statement an offer for one or more products (goods or services) or other upsells to an account holder, and to allow the account holder to purchase those offered products using the billing statement.

Since each billing statement records portions of an account holder's purchase history, and is almost certain to be read by the account holder, the billing statement may be advantageously employed to offer and sell products complementary to previously-purchased products to the account holder. The offered product is determined from previous purchases that are recorded on the billing statement, and accordingly may be a product that the account holder is more likely to purchase. Not only may the offered product be related to previous purchases, the offered product may also be desirably priced. The merchant may set the price for the offered product attractively low, because the certainty of repeat business from the account holder can partially or fully fund the discount. Also, the merchant may be able to offer the complementary product at a substantial discount by requiring that the account holder first qualify for the offer by purchasing a first product at full price.

Furthermore, the billing statement containing the offer arrives a period of time after the account holder has made purchases recorded on that billing statement. During that period of time, the account holder may have reconsidered those purchases and realized that a complementary product should have been purchased as well. For example, an account holder may buy a television, and a week later wish he had also bought a warranty. Rather than making a second trip to the store, it is more convenient for the account holder to accept an offer in his billing statement for a warranty. Account holders therefore benefit from being informed of potentially-desirable related products, and the opportunity to purchase those products conveniently. In summary, account holders take an active role by responding to the offers in their billing statements, rather than passively receiving advertising or award notification.

Merchants likewise benefit from the generation of additional sales, which increases the likelihood that account holders will continue to purchase from the merchant. Furthermore, since the merchant may determine what products are offered, the merchant can manage its inventory in an efficient manner while also generating additional profits.

The description that follows is arranged into the following sections: Registration by Merchants, Printing Statements with Upsell Offers, Receiving Acceptance of Upsell Offers and Providing Upsells.

Registration by Merchants

Figure 1:
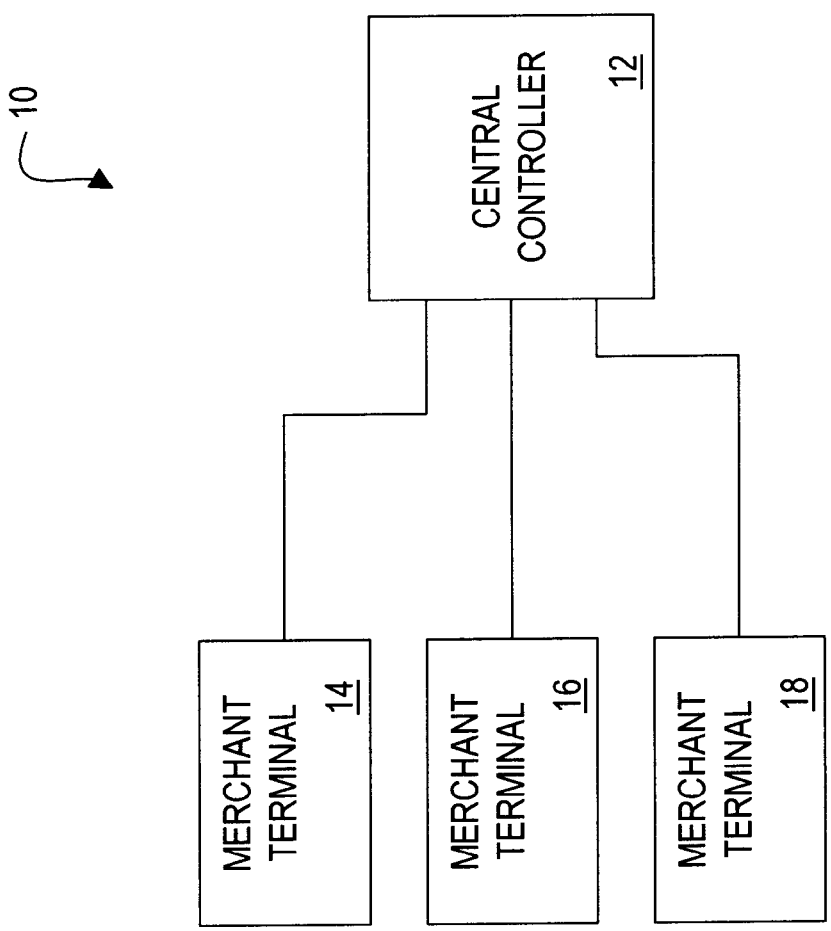
FIG. 1 is a schematic illustration of an apparatus for using a billing statement to provide an upsell offer to an entity.

Referring to FIG. 1, an apparatus 10 comprises a central controller 12 in communication with each of merchant terminals 14, 16 and 18. The central controller 12 may be in communication with the merchant terminals 14, 16 and 18 through any of a number of known connection methods, such as through an Internet connection or a wireless communication protocol. The central controller is typically operated by or on behalf of a credit card issuer, such as CitiBank, a credit card clearing house, such as First Data Corporation, or a product manufacturer, such as Sony Corporation. Each of the merchant terminals 14, 16 and 18 is a data entry device accepting data generated by or on behalf of a merchant such as a retail store. For example, the merchant terminals 14, 16 and 18 may be store computers operated by merchant employees, telephones interfacing with a voice response unit (VRU) or may be credit card issuer terminals operated by the issuer's account management representatives.

Each of the merchant terminals 14, 16 and 18 collects input information regarding "upsells" which a merchant desires to offer on billing statements, and in turn transmits the information to the central controller 12 for storage. As used herein, an "upsell" is a product which is offered on a billing statement for a predetermined upsell price. Types of upsells which are described in detail herein include an additional product for a discounted price, and a voucher which is redeemable for a product or a discount thereon. Various other types of upsells may be offered on billing statements without departing from the scope and spirit of the present invention.

The merchant terminals 14, 16 and 18 are computers, network terminals, telephones or other devices for transmitting the information regarding upsell offers to the central controller 12. Although three merchant terminals are shown in FIG. 1, any number of merchant terminals may be in communication with the central controller 12. The merchant terminals 14, 16 and 18 can encrypt the information regarding upsell offers for security purposes, and transmit the encrypted information to the central controller 12, which decrypts the encrypted information. Many encryption and decryption techniques are well known, and described in the text "Applied Cryptography, Protocols, Algorithms, and Source Code in C", Second Edition, by Bruce Schneier.

Figure 2:
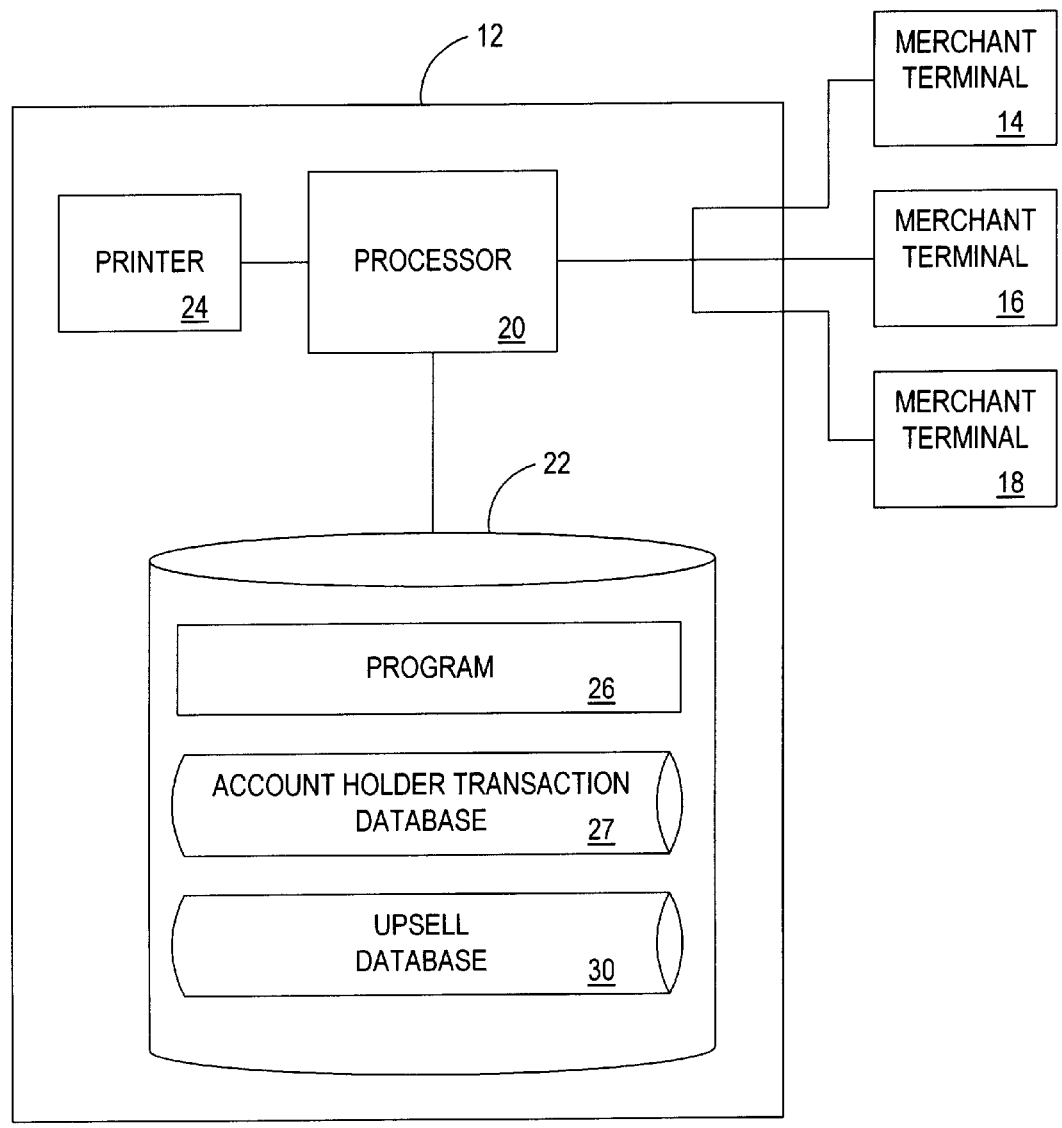
FIG. 2 is a schematic illustration of a central controller of the apparatus of FIG. 1.

Referring to FIG. 2, the central controller 12 comprises a processor 20, such as one or more conventional microprocessors, which is connected to each of a data storage device 22, such as an appropriate combination of magnetic, optical and semiconductor memory, and a printer 24. The processor 20 is in communication with each of the merchant terminals 14, 16 and 18. The processor 20, the storage device 22 and the printer 24 may each be (i) located entirely within a single computer or other computing device; (ii) connected to each other by a remote communication link, such as a serial port cable, telephone line or radio frequency transceiver; or (iii) a combination thereof. For example, the central controller 12 may comprise one or more computers which are connected to a remote server computer for maintaining databases or printing large numbers of billing statements.

The storage device 22 stores (i) a program 26 for controlling the processor 20; (ii) an account holder transaction database 27; and (iii) an upsell database 30. The program 26 drives the processor 20 to operate in accordance with the present invention, and particularly in accordance with the methods described in detail herein. The program 26 also includes program elements that may be necessary, such as "device drivers" for allowing the processor to interface with the printer 24 and computer peripheral devices. Appropriate device drivers and other necessary program elements are known to those skilled in the art, and need not be described in detail herein. The databases 27 and 30 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

Referring to FIG. 3, the upsell database 30 stores entries 32, 34, 36, 38 and 40 which each define upsell offers, and which each include (i) a merchant identifier 42 for identifying the merchant providing the information, (ii) a condition identifier 44 for specifying at least one upsell offer condition, (iii) an upsell identifier 46 for specifying an upsell to be offered when the at least one upsell offer condition is met, and (iv) an upsell price 48 to pay for the upsell.

One type of upsell offer condition is a purchase of a predefined product. For example, an upsell may be offered to an account holder if that account holder has purchased a 19-inch television. An upsell offer condition may also be predicated upon a purchase price. For example, an upsell may be offered if a purchase is for more than a predefined price, or if a purchase is for a price within a predefined price range. Another type of upsell offer condition is that a predefined number of purchases have been made. A further upsell offer condition is that a predetermined merchant has not been visited by the account holder (i.e. each of a plurality of purchases were made at a merchant other than a predetermined merchant). In addition, another type of upsell offer condition may be that a predetermined type of merchant has been visited by the account holder. Information on the type of merchant affiliated with a purchase is typically available by credit card issuers and credit card clearing houses, and can be provided in the form of Standard Industry Classification (SIC) codes generated and managed by the U.S. Department of Labor.

Many types of upsells may be offered when the corresponding upsell offer condition is satisfied. One type of upsell is a reduced price on a product or a discount off a purchase price, for example, a warranty on a television, or a $50 reduction in a purchase price to be paid. Another type of upsell is a certificate which entitles the account holder to a reduced price on a product or a discount off a purchase price. Since the merchant determines which upsells to offer, and under which conditions the upsells are offered, the merchant can efficiently manage its revenue and inventory when offering upsells. Accordingly, merchants can offer substantial discounts to account holders who have made a profitable, qualifying purchase.

Printing Statements with Upsell Offers

After the central controller 12 (FIGS. 1 and 2) stores information regarding upsell offers for a merchant, that merchant may offer those upsells to account holders through billing statements. The central controller 12 determines upsells to offer each account holder based on previous transactions by the account holder. In addition, the central controller 12 may also determine upsells to offer based further on the account holder's ability to pay for an offered upsell.

For each account holder, the central controller 12 (i) receives and stores billing items generated by transactions (e.g., purchases) on the account holder's account; (ii) determines if the billing items satisfy any upsell offer conditions stored in the upsell database 30 (FIG. 3); and (iii) if the billing items satisfy an upsell offer condition, determines an upsell corresponding to the upsell offer condition, and prints onto the billing statement indicia that specifies the upsell. Each of these steps is described below.

Receiving Billing Items

Transactions on an account holder's account, such as purchases and payments, are recorded, received and stored by the central controller 12 for use in generating a billing statement for the account holder. The description that follows employs an embodiment in which the billing statement is a billing statement of a credit card account. Those skilled in the art will understand that other types of statements, such as telephone bills, may be used without departing from the spirit and scope of the present invention.

Figure 4:
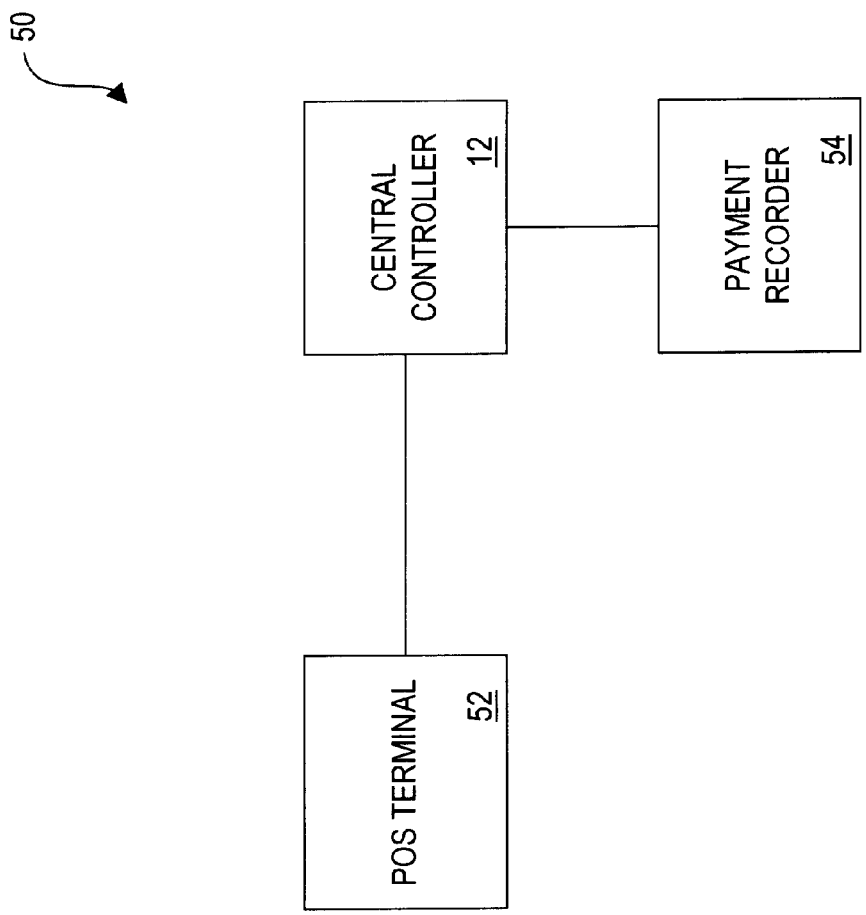
FIG. 4 is a schematic illustration of another embodiment of an apparatus for using a billing statement to provide an upsell offer to an entity.

Referring to FIG. 4, an apparatus 50 includes the central controller 12 of FIG. 1 in communication with each of a point-of-sale (POS) terminal 52 and a payment recorder 54. Although one POS terminal and one payment recorder are shown in FIG. 4, any number of POS terminals and payment recorders may be in communication with the central controller 12. Furthermore, those skilled in the art will understand that other devices may be in communication with the central controller 12 and transmit information thereto.

The POS terminal 52 is typically a card authorization terminal (CAT), such as those manufactured by Verifone, Inc., or a similar device for generating data relating to a purchase, such as purchase price and the item(s) purchased. The POS terminal 52 transmits this generated data to the central controller 12, thereby informing the central controller 12 of information regarding the purchase. The central controller in turn stores this information in the account holder transaction database 27 (FIG. 2). The POS terminal 52 may transmit information to the central controller 12 in many different forms. For example, the POS terminal 52 may include a credit card reader (not shown) which uses the MasterCard Purchasing Card Level III protocol to transmit product identification and other purchase-related information to the central controller 12.

The payment recorder 54 is typically a computer or similar device that allows entry of data regarding payments of account balances by account holders. For example, the payment recorder 54 can be operated by data entry personnel in the collection department of a credit card issuer. The payment recorder 54 transmits this data to the central controller 12, thereby informing the central controller 12 of information regarding the payments. The central controller likewise stores this information in the account holder transaction database 27 (FIG. 2).

Referring to FIG. 5, a record 60 of the account holder transaction database 27 (FIG. 2) defines the transactions applied against an account holder account identified by an account identifier 62. The account holder transaction database 27 (FIG. 2) typically includes a plurality of records such as the record 60, each defining the transactions applied against a different account holder account. The record 60 includes entries 64, 66, 68, 70, 72 and 74 which each describe a transaction applied against the account holder account identified by the account identifier 62. Each of the entries 64, 66, 68, 70, 72 and 74 specifies (i) a transaction identifier 76 for uniquely indicating a transaction; (ii) a transaction type 78; (iii) a date 80 of the transaction; (iv) a date 82 when the transaction is "posted" (made available to the central controller 12 of FIG. 4); (v) a transaction amount 84; (vi) a merchant identifier 86 for specifying a merchant participating in the transaction; (vii) an item identifier 88 for specifying an item purchased, if any; and (viii) a description 90 of the transaction. It will be understood by those skilled in the art that any number of entries may be used.

In summary, the account holder transaction database 27 stores information related to transactions by account holders. The stored information is in turn used to determine, for each account holder, whether the account holder should be offered an upsell, and if so which upsell to offer.

Determining If Any Upsell Should Be Offered

The central controller 12 (FIG. 4) analyzes the transactions of each account holder account, and typically analyzes the transactions of the most recent billing period (i.e. the current month). The upsell offers of the upsell database 30 (FIG. 3) are also analyzed in order to determine which, if any, corresponding upsell offer conditions are met by the account holder transactions. If any upsell offer conditions are met, and if the account holder has or will have sufficient credit available to pay the cost of the upsell, the corresponding upsells are offered to the account holder.

Figure 6:
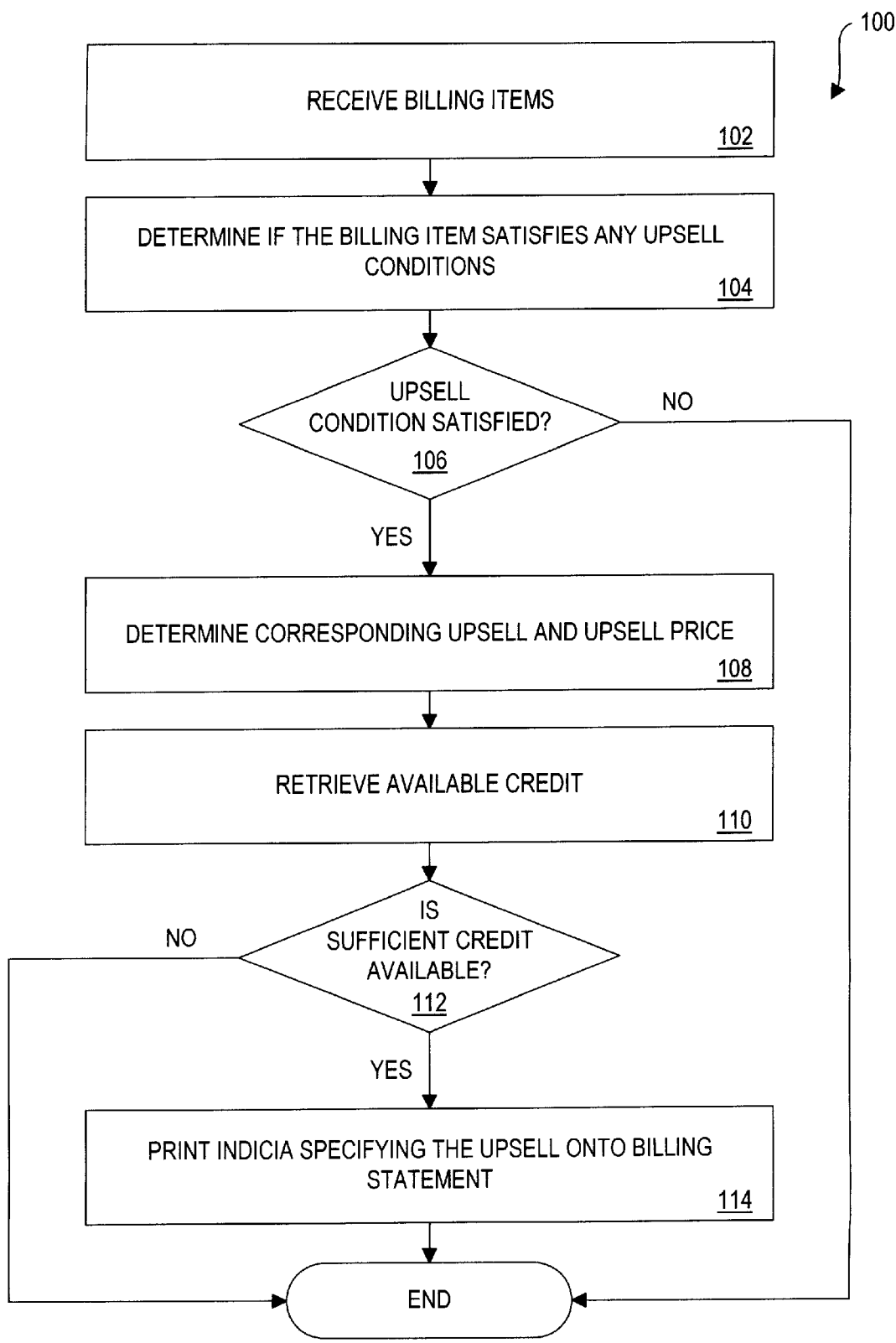
FIG. 6 is a flow chart illustrating a method for using a billing statement to provide an upsell offer to an entity.

Referring to FIG. 6, after receiving billing items for an account holder's account (step 102), the central controller 12 (FIG. 4) determines if any of the billing items satisfy any upsell offer conditions (step 104). If the billing items satisfy an upsell offer condition (step 106), the central controller 12 determines an upsell and upsell price corresponding to the upsell offer condition (step 108). The central controller 12 further retrieves the amount of credit available to the account holder (step 110). If there is sufficient credit available to pay the upsell price (step 112), the central controller 12 prints indicia that specifies the upsell onto the billing statement (step 114).

The step 112 assures that the account holder can "afford" to pay the upsell price. Such a requirement would satisfy a party such as a credit card account issuer, who may not want the account holder to be indebted for an amount he may not be able to pay. Accordingly, the central controller 12 may print the indicia that specifies the upsell only if the upsell price is not greater than a predetermined threshold. For example, the central controller 12 may print the indicia specifying the upsell only if the amount of available credit on the account exceeds a predetermined amount, such as the upsell price. In such an embodiment, the predetermined threshold would vary with each account holder account, and would vary over time as the amount of available credit changed.

Figure 7:
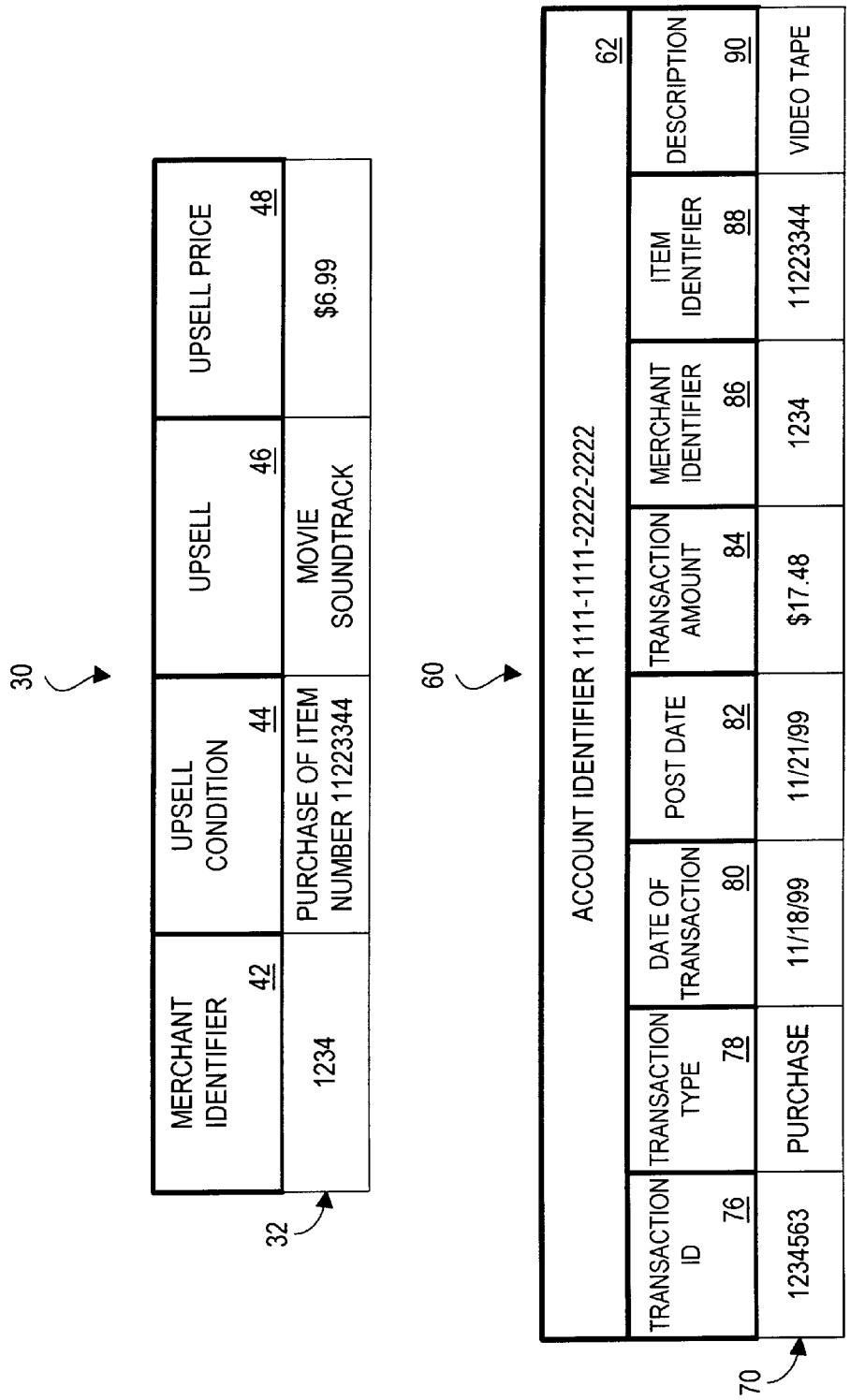
FIG. 7 is a schematic illustration of exemplary entries of the upsell database of FIG. 3 and the record of FIG. 5.

Referring to FIG. 7, a portion of the upsell database 30 of FIG. 3 is reproduced in part to show the entry 32, which defines the upsell offer of the merchant 1234. A portion of the record 60 of FIG. 5 is also reproduced in part to show the entry 70. The entry 70 describes a transaction that meets the upsell offer condition specified by the entry 32, namely a purchase of the item number 11223344. Accordingly, the corresponding upsell, a movie soundtrack for $6.99, is determined and offered on the billing statement of account "1111-1111-2222-2222".

Those skilled in the art will understand that matching transactions with upsell offer conditions may be accomplished in many ways. For example, the central controller 12 may, for each entry in the upsell database 30, search for account holder accounts having transactions in the account holder transaction database 27 that satisfy the corresponding upsell offer condition. Alternatively, the central controller 12 may, for each account holder account in the account holder transaction database 27, search for upsell offer conditions in the upsell database 30 that are satisfied.

The upsell offer condition will establish how the central controller 12 processes the upsell data and the account transaction data to determine whether the condition is satisfied by account holder billing items. For example, the central controller 12 may determine (i) if any billing item indicates a purchase of a predefined product; (ii) if any billing item indicates a purchase for more than a predefined price; (iii) if any billing item indicates a purchase for a price within a predefined price range; (iv) if any billing item indicates that at least a predefined number of purchases have been made; (v) if each billing item indicates that each of a plurality of purchases was made at a merchant other than a predetermined merchant; or (vi) any combination thereof.

Printing Offered Upsell

If the central controller 12 determines that an upsell is to be offered to an account holder, then the central controller 12 prints onto a billing statement indicia that specifies the upsell. Typically, the billing statement is a sheet of paper that is printed with a laser printer or similar printing device. The billing statement may also be an electronic bill that is accessed and displayed by a computer, terminal or similar device.

The indicia that specifies the upsell typically comprises descriptive text (e.g., "$100 off your next purchase at Merchant XX") and an upsell price to pay for the upsell. The indicia may further comprise a redemption code uniquely identifying the upsell. The central controller 12 generates the code and prints the code on the billing statement. In addition, the printed indicia may further comprise a telephone number to call in order to receive further information or authorization. For example, the text "To receive your upsell code, call 1-800-555-5555 and enter the upsell code 98765" may be printed on a billing statement.

Receiving Acceptance of Upsell Offers

Once indicia specifying upsell offer is printed onto a billing statement and the billing statement is provided to the account holder, the account holder responds if he desires to accept any upsell(s) offered on the statement. Once the central controller 12 receives an indication that an upsell was accepted, then the upsell is provided to the account holder.

The account holder may select offered upsells on the billing statement in many ways. For example, a check box may be printed on the statement for each offered upsell. As used herein, the term "check box" refers to any portion of the billing statement that may be altered by the account holder to indicate acceptance of a corresponding upsell. To accept an upsell, the account holder draws a check mark, draws a circle, punches a hole, removes a latex scratch-off coating or otherwise alters the corresponding check box. The statement is returned, typically accompanying payment for the account. The returned statement is received and processed to determine whether any check box was altered.

The returned statement may be processed manually or by a machine. For example, predetermined locations of the billing statement corresponding to the check box locations may be optically scanned for indicia of acceptance. A signal indicative of whether the upsell was accepted is thereby generated. Alternatively, the statement may be read by a human operator, who in turn enters a signal indicative of whether the upsell was accepted via a data entry terminal. The data entry terminal may be a computer or other device that generates signals in accordance with user input.

Rather than indicating acceptance of an upsell on a returned statement, the account holder may also indicate whether the upsell was accepted by transmitting signals via a telephone voice response unit (VRU). As is known in the art, typical VRUs allow an account holder to respond to queries and enter data by calling a predetermined telephone number and pressing dual-tone multifrequency (DTMF) buttons on his telephone. In such an embodiment of the present invention, the billing statement would be printed with a telephone number to call, and one or more codes to enter to indicate selected upsells. The codes may be unique to the credit card account of the account holder, or the account holder may be prompted to enter a credit card number to which the corresponding upsell price is charged.

Acceptance of an upsell will often require payment of a predetermined upsell price. Accordingly, the upsell may not be provided unless payment of the upsell price is received or acknowledged by the central controller 12. Payment of the upsell price may be rendered by being mailed to the account issuer, or the account holder's account may be charged the upsell price, which requires less action by, and is thus more convenient for, the account holder. If the account is a credit card account or is otherwise associated with a financial identifier such as a credit card account number, then the use of that financial identifier may be initiated to collect an upsell price from the account holder.

Once the upsell is provided and payment has been received, the central controller 12 may have to reconcile the receipt of payment with the providing of the upsell. For example, if the account issuer has received payment, but the upsell is to be provided by a merchant, then the account issuer must in turn initiate payment to the merchant. Typically, such reconciliation will comprise an entry in a billing database reflecting a payment or credit from the account issuer to the merchant.

Providing Upsells

The upsell is provided to the account holder by the merchant or by the account issuer on behalf of the merchant.

In either case, the merchant is notified by the issuer regarding the account holder's acceptance of the upsell offer.

The upsell provided to the account holder may comprise reducing a price charged for a future purchase of a predetermined product or for a purchase comprising a plurality of products. Thus, the account holder is provided with the opportunity to obtain a product or products at a discount. The reduced price may be a reduction by a predetermined amount, such as $20 off, or by a predetermined percentage, such as 10% off the purchase price. The reduced price may be generated when a subsequent billing statement is created, and the billing statement would include an account credit. Alternatively, the reduced price may be generated during a subsequent transaction with a merchant. For example, when the price of a product is calculated at a POS terminal, the central controller 12 may transmit an upsell code thereto. The central controller 12, in turn, directs the POS terminal to subtract a predetermined amount from the price, thereby obtaining a reduced price. The use of upsell codes is described in pending U.S. patent application Ser. No. 08/883,308, entitled "System and Method for Establishing and Executing Functions to Affect Credit Card Accounts and Transactions", filed on Jun. 26, 1997, incorporated herein by reference.

The upsell provided to the account holder may comprise a printed certificate, such as a gift certificate or voucher, which is redeemable for products or discounts on products. The printer 24 (FIG. 2) of the central controller 12 (FIG. 2) generates the certificate by printing predetermined indicia onto a paper or other substrate. The central controller 12 generates one or more codes, each of which identifies an account, product, price or discount. The central controller 12 may then generate an identifier, such as a bar code, based on each code, and prints the identifier onto the substrate.

Although the present invention has been described with respect to a preferred embodiment thereof, those skilled in the art will understand that various substitutions may be made to those embodiments described herein without departing from the spirit and scope of the present invention. For example, a great number of types of upsells and methods of providing those upsells will be apparent to those skilled in the art.

What is claimed is:

1. A method for generating a billing statement, comprising:
   receiving data identifying at least a first billing item;
   determining if the at least first billing item satisfies an upsell offer condition;
   determining an upsell offer corresponding to the satisfied upsell offer condition; and
   generating the billing statement, the billing statement including information specifying the upsell offer.

2. The method of claim 1, wherein the at least first billing item includes data identifying at least one transaction applied against a customer account.

3. The method of claim 2, wherein the at least first billing item includes at least one of: (i) information identifying a product; (ii) information identifying a merchant; and (iii) information identifying a purchase price.

4. The method of claim 1, wherein determining if the at least one billing item satisfies an upsell offer condition further comprises:
   determining a product type associated with the at least one billing item; and
   determining if the upsell offer condition applies to the product type.

5. The method of claim 1, wherein determining if the at least one billing item satisfies an upsell offer condition further comprises:
   determining a purchase price associated with the at least one billing item; and
   determining if the purchase price satisfies the upsell offer condition.

6. The method of claim 1, wherein determining if the at least one billing item satisfies an upsell offer condition further comprises:
   determining a product type and a purchase price associated with the at least one billing item;
   determining if the upsell offer applies to the product type; and
   determining if the purchase price satisfies the upsell offer condition.

7. The method of claim 1, wherein the upsell offer condition is at least one of: (i) a purchase for more than a predetermined price; (ii) a purchase for a price within a predefined price range; (iii) a predefined number of purchases made; and (iv) a plurality of purchases, each made at a merchant other than a predetermined merchant.

8. The method of claim 1, in which the upsell offer condition is a purchase of a predefined product, and in which the step of determining if the at least one billing item satisfies an upsell offer condition comprises:
   determining if the at least one billing item indicates a purchase of the predefined product.

9. The method of claim 1, in which the upsell offer condition is a purchase for more than a predefined price, and in which the step of determining if the at least one billing item satisfies an upsell offer condition comprises:
   determining if the at least one billing item indicates a purchase for more than the predefined price.

10. The method of claim 1, in which the upsell offer condition is a purchase for a price within a predefined price range, and in which the step of determining if the at least one billing item satisfies an upsell offer condition comprises:
    determining if the at least one billing item indicates a purchase for a price within the predefined price range.

11. The method of claim 1, in which the upsell offer condition is a predefined number of purchases made, and in which the step of determining if the at least one billing item satisfies an upsell offer condition comprises:
    determining if the at least one billing item indicates that at least the predefined number of purchases have been made.

12. The method of claim 1, in which the upsell offer condition is a plurality of purchases, each made at a merchant other than a predetermined merchant, and in which the step of determining if the at least one billing item satisfies an upsell offer condition comprises:
    determining if each of the at least one billing item indicate that each of a plurality of purchases was made at a merchant other than a predetermined merchant.

13. The method of claim 1, wherein determining an upsell further comprises:
    determining a price of the upsell.

14. The method of claim 1, wherein determining an upsell further comprises:
    generating a redemption code associated with the upsell.

15. The method of claim 1, wherein determining an upsell further comprises:
    determining contact information to receive a redemption code associated with the upsell.

16. The method of claim 1, wherein generating the billing statement further comprises:

printing indicia on the billing statement.

17. The method of claim 16, wherein the indicia include at least one of: (i) an upsell offer price; (ii) an upsell offer product; and (iii) an upsell offer redemption code.

18. The method of claim 1, wherein the billing statement is a customer account billing statement, the method further comprising:

determining an amount of available credit of the customer account; and wherein generating the billing statement is only performed if the amount of available credit exceeds a predetermined amount.

19. The method of claim 1, wherein the billing statement is a customer account billing statement, the method further comprising:

determining an amount of available credit of the customer account;

determining an upsell price corresponding to the upsell offer; and if the amount of available credit exceeds the upsell price, generating the billing statement.

20. An apparatus, comprising:

a storage device;

a processor connected to the storage device; and a printer connected to the processor;

the storage device storing a program for controlling the processor; and the processor operative with the program to receive data identifying at least one billing item;

determine if the at least first billing item satisfies an upsell offer condition;

determine an upsell offer corresponding to the satisfied upsell offer condition; and generate the billing statement, the billing statement including information specifying the upsell offer.

21. An apparatus for providing an upsell offer, comprising:

means for receiving data identifying at least a first billing item;

means for determining if the at least first billing item satisfies an upsell offer condition;

means for determining an upsell offer corresponding to the satisfied upsell offer condition; and means for generating the billing statement, the billing statement including information specifying the upsell offer.

22. A method for providing an upsell to an entity, comprising:

generating a billing statement including information specifying a first billing item and an upsell offer associated with the first billing item;

forwarding the billing statement to the entity;

receiving an indication of whether the entity accepted the upsell offer; and if the upsell offer was accepted, providing the upsell to the entity.

23. The method of claim 22, wherein providing the upsell is performed only if payment of at least a predetermined upsell price is received.

24. The method of claim 22, further comprising:

initiating use of a financial identifier to collect an upsell price from the entity.

25. The method of claim 22, further comprising:

initiating payment to a third party account if the upsell was accepted.

26. The method of claim 22, wherein receiving the indication of whether the upsell was accepted comprises:

selecting the upsell from a plurality of upsells.

27. The method of claim 22, wherein receiving the indication of whether the upsell was accepted comprises:

scanning the billing statement for indicia of acceptance; and generating a signal indicative of whether the upsell was accepted.

28. The method of claim 27, wherein scanning comprises:

optically scanning predetermined locations of the billing statement.

29. The method of claim 22, wherein receiving the indication of whether the upsell was accepted comprises:

receiving from a data entry terminal a signal indicative of whether the upsell was accepted.

30. The method of claim 22, wherein receiving the indication of whether the upsell was accepted comprises:

receiving signals from a voice response unit.

31. The method of claim 22, wherein providing the upsell comprises:

reducing a price charged.

32. The method of claim 31, wherein reducing a price charged comprises:

reducing a price charged for a predetermined product.

33. The method of claim 32, in which the price is reduced by a predetermined amount.

34. The method of claim 31, wherein reducing comprises:

determining a price; and subtracting a predetermined amount from the price to obtain a reduced price.

35. The method of claim 31, wherein reducing is performed at a POS terminal.

36. The method of claim 31, wherein reducing is performed upon generating a subsequent billing statement.

37. The method of claim 22, wherein providing the upsell comprises:

printing a certificate.

38. The method of claim 37, wherein printing a certificate comprises:

printing a predetermined identifier onto a certificate.

39. The method of claim 38, further comprising:

generating a code which identifies a predetermined product; and generating the predetermined identifier based on the code.

40. The method of claim 38, further comprising:

generating a code which identifies a predetermined price; and generating the predetermined identifier based on the code.

41. The method of claim 38, further comprising:

generating a code which identifies a predetermined discount; and generating the predetermined identifier based on the code.

42. An apparatus, comprising:

means for generating a billing statement including information specifying a first billing item and an upsell offer associated with the first billing item;

means for forwarding the billing statement to the entity;

means for receiving an indication of whether the entity accepted the upsell offer; and if the upsell offer was accepted, means for providing the upsell to the entity.

43. An apparatus, comprising:

a storage device;

a processor connected to the storage device; and a printer connected to the processor;

the storage device storing a program for controlling the processor; and the processor operative with the program to generate a billing statement including information specifying a first billing item and an upsell offer associated with the first billing item;

forward the billing statement to the entity;

receive an indication of whether the entity accepted the upsell offer; and if the upsell offer was accepted, provide the upsell to the entity.

\* \* \* \* \*